United States Patent [19]
Ebner et al.

[11] Patent Number: 4,732,812
[45] Date of Patent: Mar. 22, 1988

[54] MAGNETIC RECORDING MEDIUM

[75] Inventors: Stephen R. Ebner, Cottage Grove; Gene A. Sjerven, Lake Elmo; Arthur J. Ellsworth, South St. Paul, all of Minn.; Takashi Amano, Yokohama; Nobuyoshi Kawasaki, Sagamihara, both of Japan

[73] Assignee: Minnesota Mining and Manufacturing Company, St. Paul, Minn.

[21] Appl. No.: 877,268

[22] Filed: Jun. 23, 1986

[51] Int. Cl.4 ............................................. G11B 5/702
[52] U.S. Cl. ............................. 428/425.9; 252/62.54; 427/128; 428/328; 428/329; 428/694; 428/695; 428/900; 428/522
[58] Field of Search ............ 428/694, 695, 900, 425.9, 428/328, 329, 704, 522; 427/131, 128; 252/62.54; 360/134-136

[56] References Cited

U.S. PATENT DOCUMENTS

| 4,018,968 | 4/1977 | Neumann | 428/695 |
| 4,501,795 | 2/1985 | Takeuchi | 428/329 |
| 4,521,486 | 6/1985 | Ninomiya et al. | 428/407 |
| 4,526,837 | 7/1985 | Ohtsuki | 428/694 |
| 4,529,661 | 7/1985 | Ninomiya et al. | 428/425.9 |
| 4,540,627 | 9/1985 | Ishizawa | 428/328 |

FOREIGN PATENT DOCUMENTS

| 0141606 | 11/1979 | Japan | 428/694 |
| 56-134320 | 10/1981 | Japan . | |
| 59-157841 | 9/1984 | Japan . | |
| 0020315 | 2/1985 | Japan | 428/694 |
| 60-29929 | 2/1985 | Japan . | |
| 1039930 | 2/1986 | Japan | 428/694 |
| 1039931 | 2/1986 | Japan | 428/694 |

Primary Examiner—Ellis P. Robinson
Attorney, Agent, or Firm—Donald M. Sell; James A. Smith; Douglas B. Little

[57] ABSTRACT

A magnetic medium consisting essentially of a cured compound derived from a low-molecular weight, phosphorylated, polyoxyalkyl polyol and an organic isocyanate compound. The binder may also include a vinyl polymer and/or a polyoxyalkyl polyol.

26 Claims, No Drawings

MAGNETIC RECORDING MEDIUM

FIELD OF INVENTION

This invention relates to a magnetic recording medium and, particularly, to a magnetic recording medium with high pigment loading capabilities, reduced stiction, improved runability and hydrolytic stability, higher output and better surface smoothness.

BACKGROUND

A magnetic recording medium typically consists of a cured coating derived from a dispersion of magnetic particles in a binder coated on a non-magnetic support. In audio and video tapes, the tapes often contain a back coating for anti-static protection. The back coat may have the same composition as the front coat, or merely be a coating containing conductive carbon black. In the case of flexible magnetic recording disks, both sides of the non-magnetic support are usually coated with the dispersion of magnetic particles in a binder.

The binder typically consists of curable polymeric resins such as polyester urethanes, nitrocellulose, poly(-vinyl chloride/vinyl acetate/vinyl alcohol), and poly(-vinylidene chloride). In addition to binder and magnetic particles, the recording medium usually contains dispersant to help uniformly disperse the magnetic particles, and sometimes lubricant and a head cleaning agent.

A large percentage of currently produced magnetic media use polyester urethanes as part of the binder system. Polyester urethane elastomers are susceptible to environmental degradation by hydrolysis, a reaction which occurs between the recording medium and atmospheric water vapor. Hydrolysis of a polyester involves the action by water on the covalent bond of the ester functional group that links the backbone of the polymer.

Binder hydrolysis results in operational problems including the magnetic layer becoming sticky and gummy with resultant shedding of the sticky fragments. Also, frictional concerns result from the hydrolysis of the ester binder component, including increased stiction and decreased ability of the medium to slide smoothly over heads, guide pins, and other surfaces. A probable cause for the increased friction is the presence of carboxylic acid and alcohol moieties among the degradation products of hydrolysis. This increases the attractive interaction between the magnetic coating layer and the surfaces it contacts.

In addition to problems associated with ester hydrolysis, problems arise as the level of magnetic particle loading is increased. Modern development efforts aim at achieving very high data packing densities on a recording surface. Thus, greater density of magnetic particles is required. Generally, magnetic particle loading is considered high when the percent of magnetic oxides by weight of the solids is above about 72%.

The first problem encountered with increased densities of magnetic particles is the resultant decrease in space available for other necessary components. In other words, as more magnetic particles are used there is less and less space for binder and dispersant. If insufficient binder is used, problems such as loss of reproduction output and decreased durability result as magnetic particles are dislodged from the binder and deposited on the heads, guide pins, and other surfaces. The problems which occur when insufficient dispersant is used are discussed below.

Further, as the level of magnetic particles increases it becomes more difficult to homogeneously disperse the particles into the magnetic coating layer. In order for the magnetic recording medium to have optimal magnetic characteristics and electromagnetic transducing characteristics, the magnetic particles must be homogeneously dispersed within the magnetic coating layer. Thus, increased levels of magnetic particle loading dictate that increased levels of dispersant are used. Increased dispersant levels further compound the space constraints associated with increased particle loading.

Commonly used dispersants include higher aliphatic amines, higher fatty acids, esters of higher fatty acids, sorbitol, sodium alkylbenzenesulfonate and the like. Increased levels of dispersants used to disperse the higher levels of magnetic particles often result in an increase in the frictional force between the magnetic coating and the various surfaces the media contacts and results in the reduction in the strength of the magnetic coating. These effects result in problems with, for example, audio or video tapes, which include wow, flutter, jitter and skew, along with problems stemming from the weakened coating such as decreased output, head clogging, and frequent dropouts.

Magnetic recording media are generally prepared by coating a dispersion of the magnetic particles, binder, dispersant and other additives onto the non-magnetic support. In addition to the dispersibility difficulties which result from higher levels of particle loading, increases in the viscosity of the dispersion can make obtaining the required flat, smooth, magnetic surface more difficult. In the coating transfer step, during the manufacture of the magnetic recording medium, increased viscosity makes it increasingly defect to transfer the coating smoothly. Higher viscosities can also cause local retention of the coating in the transport path. In addition, dropouts may be formed and good surface properties may be difficult to obtain.

The viscosity of the dispersion is increased as the molecular weight of the binder polymers used is increased. Typically the binder systems include polymers having molecular weights in the range of 20,000 to 200,000. As set forth above, increased viscosity can have undesirable results. However, it has previously been difficult to obtain magnetic recording media with the desired performance properties from binder materials having low molecular weights. Previously, when low molecular weight polymers were used, it was difficult to get sufficient cross-linking; resulting in decreased performance characteristics, notably runability, and increased stiction.

SUMMARY OF THE INVENTION

An effective means has now been found to homogeneously disperse and securely bind high levels of magnetic particles to the non-magnetic support through the use of a low molecular weight, dispersing binder, without the use of polyesters, thus avoiding the problems discussed above. A preferred binder can be derived from polymer units having molecular weights less than about 2500.

The preferred binder systems used in the inventive magnetic medium consists essentially of a cured compound derived from a low-molecular-weight, phosphorylated, polyoxyalkyl polyol and an organic isocyanate compound. The phosphorylated polyoxyalkyl polyol acts as both a dispersant and a binder thus significantly reducing both the space constraints imposed on the binder system by high levels of magnetic particles, and the problems associated with increased levels of free dispersants. In addition, the polyols have molecular weights of less than about 2500, thus reducing the problems associated with coating dispersions having higher viscosities.

The phosphorylated polyoxyalkyl polyol can be represented by the following general formula:

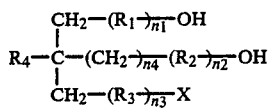

wherein
$n_1$, $n_2$ and $n_3$ may independently be 0 to 10 inclusive and $n_4$ is 0 or 1
$R_1$, $R_2$, $R_3$ are independently selected from the group consisting of:

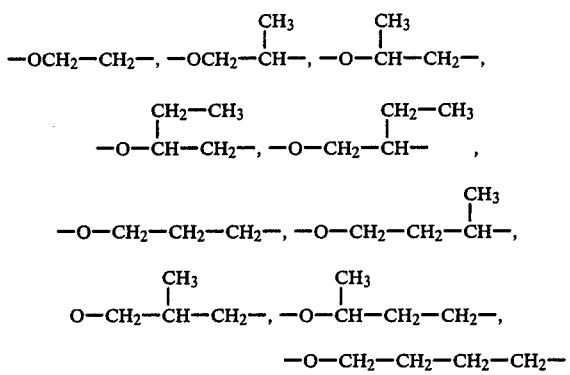

$R_4$ is selected from the group consisting of: H, —CH$_3$, —CH$_2$—CH$_3$, —CH$_2$—CH$_2$—CH$_3$,

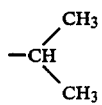

X is a dispersing group such as

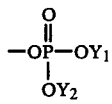

wherein $Y_1$ and $Y_2$ are selected from the group consisting of H, Na, Li, K.

It should be understood that it would be within ordinary skill in the art to substitute halides, for example, Cl for various H atoms of the above formula.

The phosphorylated polyoxyalkyl polyol and the isocyanate compound are present in a ratio which effectively homogeneously disperses the magnetic particles and securely binds the magnetic particles when coated on a non-magnetic support. It has been found that this is accomplished by providing the phosphorylated polyoxyalkyl polyol in an amount of about 30 to 80 percent by weight of the binder and the isocyanate compound in an amount of about 20 to 70 percent by weight of the binder.

The present invention also contemplates the addition of a polyoxyalkyl polyol to the above two component binder system. The addition of a polyoxyalkyl polyol is particularly preferred when lower levels of particle loading allow for lower amounts of the phosphorylated polyoxyalkyl polyol, the dispersing binder component. When the levels of particle loading permit, the addition of a polyoxyalkyl polyol may be preferred because of the increased cross-linking capabilities of this added compound. Increased cross-linking often results in better performance characteristics, notably decreased stiction.

The polyoxyalkyl polyol may be represented by the same general formula as the phosphorylated polyol above except that it does not contain the dispersing group, with X instead representing an —OH group. It is the additional hydroxyl group which allows the increased site for cross-linking. The three components are present in a ratio which effectively homogeneously disperses and securely binds the magnetic particles when coated on the non-magnetic support. It has been found that this can be accomplished by providing the phosphorylated polyoxyalkyl polyol in an amount in the range of 10 to 60 percent by weight of the binder, the polyoxyalkyl polyol in an amount in the range of 0.1 to 50 percent by weight of the binder and the isocyanate compound in an amount in the range of 30 to 60 percent by weight of the binder.

The present invention further contemplates the addition of a third component, a vinyl polymer, preferably having hydroxyl functionalities, to facilitate cross-linking of the vinyl polymer into the binder system. When levels of oxide loading permit, it may be desirable to add the vinyl compound because vinyl polymers generally have a high glass transition temperature ($T_g$) and can thus improve wear characteristics. This three component binder system consists essentially of a cured compound derived from a phosphorylated polyoxyalkyl polyol, an isocyanate compound and a vinyl polymer in a ratio which effectively homogeneously disperses and securely binds the magnetic particles. The ranges of amounts found to accomplish this are 5 to 60 percent phoshorylated polyoxalkyl polyol, 20 to 60 percent isocyanate and 0.1 to 45 percent vinyl polymer based on the total weight of the binder.

Further contemplated by the instant invention is a magnetic medium having a four component binder system, consisting essentially of a cured compound derived from a phosphorylated polyoxyalkyl polyol, a polyoxyalkyl polyol, an isocyanate compound and a vinyl polymer preferably having an —OH functionality, in a ratio which effectively homogeneously disperses and securely binds the magnetic particles. As discussed above, as particle loading levels permit it may be desirable to add a polyoxyalkyl polyol or a vinyl polymer. The four component binder system includes both of these additional components added to the original two component binder system. The ranges of amounts found to effectively homogeneously disperse and securely bind the magnetic particles are 5 to 60 percent phosphorylated polyoxyalkyl polyol, 0.1 to 50 percent polyoxyalkyl polyol, 20 to 60 percent isocyanate, and 0.1 to 45 percent vinyl polymer based on the total weight of the binder.

The four binder systems above consist essentially of two, three or four main components. Also included within the scope of this invention are the above binder systems with minor amounts of other binder components added. For example, polyesters may be added in amounts which do not significantly adversely affect the desired characteristics of the media of the present invention, preferably less than 5% by weight of the binder.

The magnetic recording medium of the present invention has improved hydrolytic stability, the capability of high magnetic particle loading, improved surface smoothness, better output, lower noise, improved runability and reduced striction. A delicate balance of these properties exists and when provided with the teachings of the present invention, they may be adjusted as desired by one skilled in the art within the ranges of components disclosed in the present application.

DETAILED DESCRIPTION

The magnetic recording media of the present invention comprises a non-magnetic support and a coating of a dispersion of a magnetic powder in a novel binder. The novel binder consists essentially of a cured compound derived from a phosphorylated polyoxyalkyl polyol and an organic isocyanate compound and may include a polyoxyalkyl polyol and/or a vinyl polymer. The binder contains no more than a minor amount of a polyester. The media may also include stabilizers, carbon black, head cleaning agents, lubricants and other additives well known in the art.

The novel binder may consist essentially of a cured compound derived from the phosphorylated polyoxyalkyl polyol of the above formula and an organic isocyanate compound. The phosphorylated polyoxyalkyl polyol acts as both a dispersing agent and a binder thus obviating the need for additional dispersants. The binder may further include a polyoxyalkyl polyol of the above formula and/or a vinyl polymer. While vinyl polymer is not necessary, and in cases of very high oxide loadings may be undesirable, it has been found that vinyl can be useful and can be added as desired. Also, the polyoxyalkyl polyol can improve cross-linking and may be added as desired, for example, as durability demands, requiring more cross-linking, outweigh the need for higher outputs, requiring higher levels of oxide loading.

The binder components are present in a ratio which effectively, homogeneously disperses the magnetic particles. As effective homogeneous dispersion of magnetic particles is determined by coating the dispersion on a non-magnetic support and viewing the coating with transmitted light through a 200 power microscope. If no agglomerates larger than 5 micrometers are visible, then the magnetic particles are said to be effectively homogeneously dispersed.

In addition to acting as an effective dispersant, the binder must securely bind the magnetic particles to the non-magnetic support. If the particles are not securely bound to the non-magnetic support the medium will show a decreased durability and loss of output over the lifetime of the medium. For example, in the case of diskettes, if the particles are securely bound to the non-magnetic support the diskette will show no output loss or visual wear scars in about five million passes of a head.

A preferred phosphorylated polyoxyalkyl polyol was made from a triol which was commercially available from BASF Wyandotte Corp., trade name TP740. TP740 is no longer available, however, similar triols, TP440—molecular weight approximately 400, and TP2540—molecular weight approximately 2500 are presently commercially available from BASF Wyandotte Corp. Phosphorylated polyoxyalkyl polyol was made from TP740 by charging a reaction vessel which was purged with dry nitrogen with one hundred parts of TP740 and 20 parts of toluene. The solution was heated to 50° C. and 14 parts of polyphosphoric acid was added. After adding 42 parts of toluene the solution was heated to 80° C. The solution was stirred for two hours and then cooled to 60° C. Three parts of phosphorus pentoxide was added while maintaining a dry atmosphere over the solution. The temperature was raised to 80° C. and the solution was stirred for 4 hours to allow the reaction to occur. After cooling to 65° C., 75 parts of distilled water and 25 parts of toluene were added. The solution was stirred for 90 minutes and then allowed to phase separate for 2 hours. The lower aqueous phase was discharged and the by-products in the upper toluene layer were extracted with water. The remaining water was removed by vacuum distillation as the toluene water azeotrope. A light yellow phosphoric acid ester was obtained in a toluene solution.

The resultant product may be characterized by several tests which are well known in the art, for example, hydroxyl number, infrared spectroscopy, and base titration. The hydroxyl number may be used to determine the amount of —OH functionality. Likewise, the infrared spectrum will give a fingerprint of the product and verify the presence of the phosphate group. By titrating with sodium hydroxide the amount of product, mono substituted phosphate and by-products, phosphoric acid and disubstituted phosphate can be determined.

Examples of other useful triols which may be phosphorylated by the above process to prepare phosphorylated polyoxyalkyl polyols of the present invention include LHT-67, molecular weight 2511; LHT-112, molecular weight 1500; and LHT-240, molecular weight 700; which are commercially available from Union Carbide Corporation. Also Sunnix TQ-400, Sunnix GP-300, and Sunnix FA908, commercially available from Sanyo Kasei Co. may be used.

The organic isocyanate compound used must contain at least two isocyanate groups. Isocyanate compounds containing three or more isocyanate groups are preferred for maximum cross-linking. Both aliphatic and aromatic isocyanate compounds may be used. Aromatic isocyanate compounds are preferred because they produce a stiffer coating, i.e., a coating having a higher modulus. Examples of aromatic isocyanate compounds which are at least tri-functional include Mondur HC, Mondur MRS, and CB-60 commercially available from Mobay Chemical Corp. and Desmodur IL, commercially available from Farbenfabriken Bayer AG.

CB-60 is believed to be tris-N,N',N"(3-isocyanato-4-methyl-phenyl)-trimethylol propane carbamate, represented by formula 1. Desmodur IL is believed to be bis-1,3-di(3-isocyanato-4-methyl-phenyl)isocyanurato-4-methyl benzene, represented by formula 2. Mondur HC is believed to be n-1,6-(di-(3-methyl-4-isocyanatophenyl)isocyanurato)-isocyanatohexamethylene-3-methyl-4-isocyanatophenyl-isocyanurato-hexane. Mondur MRS is believed to be poly(isocyanato-1-phenyl-3-methylene) with 2 to 5 repeating units, represented by formula 4.

Formula 1

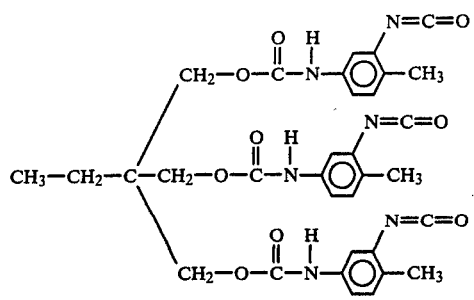

Formula 2

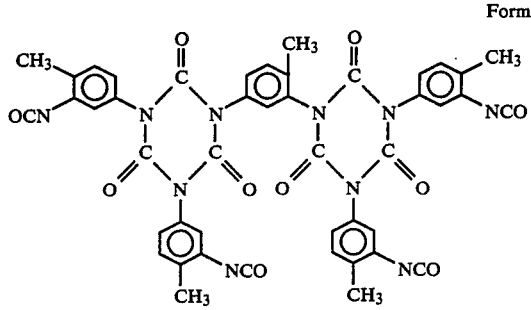

Formula 3

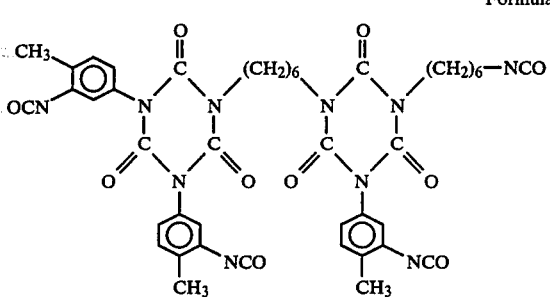

Formula 4

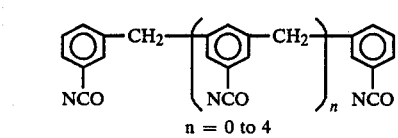

n = 0 to 4

Magnetic or magnetizable powders or particles to be employed in a magnetic layer of a magnetic recording media in accordance with the present invention may be of any known type and may include, for example, gamma-$Fe_2O_3$, $Fe_3O_4$, a mixture of gamma-$Fe_2O_3$ with $Fe_3O_4$, cobalt-doped gamma-$Fe_2O_3$ or $Fe_3O_4$, $CrO_2$, barium ferrite, Berthollide compound or ferromagnetic alloy particles such as Fe-Co, Co-Ni, Fe-Co-Ni, Fe-Co-B, Fe-Co-Cr-B, Mn-Bi, Mn-Al or Fe-Co-V, iron nitride, or the like.

Vinyl polymers preferably include a hydroxy functionality so they can cross-link into the binder system. If the vinyl polymer does not contain a hydroxy functionality they become bound by chain entanglement. Examples of vinyls which may be added include poly(vinyl chloride), poly(vinyl chloride-vinyl acetate), poly(vinyl chloride-vinyl acetate-vinyl alcohol), poly(vinylidene chloride), poly(vinyl chloride-vinyl propionate), poly(-vinyl chloride-vinyl propionate-vinyl alcohol), poly(-vinylidene chloride-vinyl chloride), poly(vinylidene chloride-acrylonitrile, poly(acrylonitrile-butadiene), poly(vinyl chloride-vinyl acetate-maleic acid), poly(vinyl chloride-vinyl acetate-vinyl maleate-vinyl alcohol), poly(vinyl chloride-vinyl propionate-vinyl maleate-vinyl alcohol).

Head cleaning agents or reinforcement materials which may be used in the magnetic layer of the magnetic recording medium of the present invention include, aluminum oxide, chromium oxide, silicon oxide, alpha-$Fe_2O_3$, titanium oxide, zirconium oxide, cerium oxide, and the like.

Non-magnetic supports on which the magnetic coating is applied may be materials such as polyesters (e.g., polyethylene terephthalate), polyolefins (e.g., polypropylene), cellulose derivatives (e.g., cellulose triacetate or cellulose diacetate), polycarbonate, polyvinyl chloride, polyimide, polyamide, polyhydrazide, metals (e.g., aluminum or copper), paper, or the like.

Lubricants which may be added to the dispersion to increase durability include, for example, myristic acid, butyl myristate, squalene, oleic acid, stearic acid, butoxyethyl stearate, butyl stearate, hexadecyl stearate, isocetyl stearate, and the like.

Stabilizers are added to stabilize the charge of the particles and prevent them from attracting each other. Examples of stabilizers which may be added include quaternary ammonium salts such as those commercially available from Witco Chemical Corp.: Emcol 241-44, Emcol CC-42, Emcol CC-59.

The procedure for making the new magnetic media are set forth in the examples below, which are intended to be purely exemplary.

EXAMPLE 1

|  | Parts by Weight |
| --- | --- |
| Co containing gamma-$Fe_2O_3$ | 100 |
| Phosphorylated polyoxypropylene-polyol | 8 |
| Quaternary ammonium salt stabilizer (Emcol CC-59, Witco Chemical Co.) | 2 |
| Carbon black | 3 |
| Aluminum oxide | 5 |
| Methyl Ethyl Ketone | 150 |
| Toluene | 75 |

The materials listed above were blended together with high shear mixing for 1 hour. The mixture was then milled in a sandmill for 16 hours. The following components were added during high speed mixing.

|  | Parts by Weight |
| --- | --- |
| Lubricant (Myristic Acid) | 1.5 |
| Lubricant (Butyl Myristate) | 3.0 |
| Tri-functional Aromatic Isocyanate compound (CB-60 manufactured by Mobay Chemical Co.) | 7.1 |

The dispersion was filtered and applied to one surface of a polyethylene terephthalate base having a thickness of 20 micrometers. The coating layer was oriented with a magnetic field and dried at 70° C. to give a thickness of 3.5 micrometers. The base and coated layer were subjected to supercalendering to obtain a mirror surface finish. This was cut into a width of 2.54 cm to obtain the recording tape.

EXAMPLES 2-4

Magnetic media were prepared in accordance with the process of Example 1 except that a vinyl chloride-vinyl acetate-vinyl alcohol copolymer (VAGH: commercially available from Union Carbide Corp.) or polyoxypropylene triol were added in the amounts shown in Table 1. The amount of the isocyanate compound was also varied. All amounts are expressed as percent of the total weight of the magnetic particles.

TABLE 1

| Example | VAGH | polyoxypropylene triol | isocyanate compound | phosphorylated polyoxypropylene polyol |
|---|---|---|---|---|
| 1 | 0 | 0 | 7.1 | 8.0 |
| 2 | 11.2 | 0 | 11.7 | 8.0 |
| 3 | 0 | 6.7 | 16.0 | 8.0 |
| 4 | 4.9 | 0 | 12.9 | 12.9 |

Head to tape conformance was measured on a Bosch digital video deck. The R.F. wave forms were broad (high signal output) and very uniform at 31.4 MHz and 50 meters per second head to tape speed. A Steinberg Drum Tester was used to measure the change in the coefficient of friction and durability over a one (1) hour time period of head to tape running. A very flat uniform response was observed over the life of the test. Good results were also obtained for squareness ratio, coercivity, residual flux density and 45° gloss.

A stiction test was also run. Stiction is the force necessary to freely spin the diskette and drive motor after the head is left in contact with the media for an extended length of time. In the present stiction tests the head was left in contact with the media for 16 hours at 65% relative humidity at 46° C. Very good stiction results were obtained. The smoothness of the diskette made from the present formulation was also excellent. It is possible to obtain lower stiction values by decreasing the smoothness of the media. It is believed that many of the commercially available diskettes obtain good stiction results, but at the expense of smoothness. The media of the present invention is exceptionally smooth and has very low stiction.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A magnetic recording medium comprising a nonmagnetic support and a coating of a dispersion of a magnetic powder in a binder, said binder consisting essentially of a cured compound derived from:
   (1) a phosphorylated polyoxyalkyl polyol present in an amount in the range of 30 to 80 percent by weight of the binder and represented by the following formula:

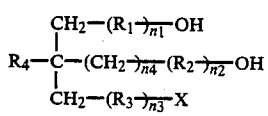

wherein $n_1$, $n_2$ and $n_3$ may independently be 0 to 10 inclusive and $n_4$ is 0 or 1

$R_1$, $R_2$, $R_3$ are independently selected from the group consisting of

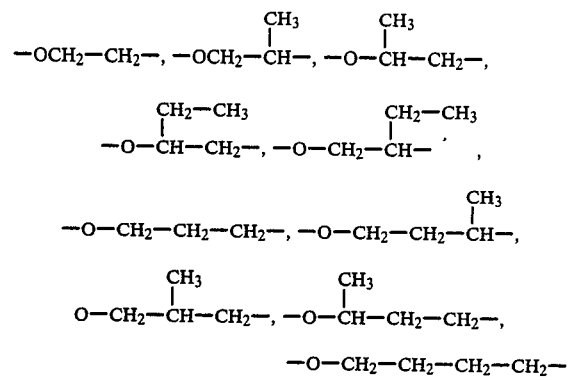

$R_4$ is selected from the group consisting of H, $-CH_3$, $-CH_2-CH_3$, $-CH_2-CH_2-CH_3$,

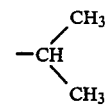

X is a dispersing group such as

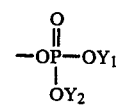

wherein $Y_1$ and $Y_2$ are selected from the group consisting of H, Na, Li, K; and (2) An organic isocyanate compound;
wherein said phoshorylated polyoxyalkyl polyol and said organic isocyanate compound are present in a ratio which effectively homogeneously disperses said magnetic powder and securely binds said magnetic powder when coated on said non-magnetic support.

2. The magnetic recording medium of claim 1 wherein said isocyanate compound is present in an amount in the range of 20 to 70 percent by weight of the binder.

3. The magnetic recording medium of claim 2 wherein said isocyanate compound contains at least three reactive isocyanate groups.

4. The magnetic recording medium of claim 3 wherein said isocyanate compound is an aromatic isocyanate compound.

5. A magnetic recording medium comprising a nonmagnetic support and a coating of a dispersion of a magnetic powder in a binder, said binder consisting essentially of a cured compound derived from:
   (1) a phosphorylated polyoxyalkyl polyol present in an amount in the range of 10 to 60 percent by weight of the binder and represented by the following formula:

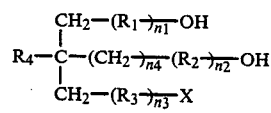

wherein
$n_1$, $n_2$ and $n_3$ may independently be 0 to 10 inclusive and $n_4$ is 0 or 1

$R_1$, $R_2$, $R_3$ are independently selected from the group consisting of

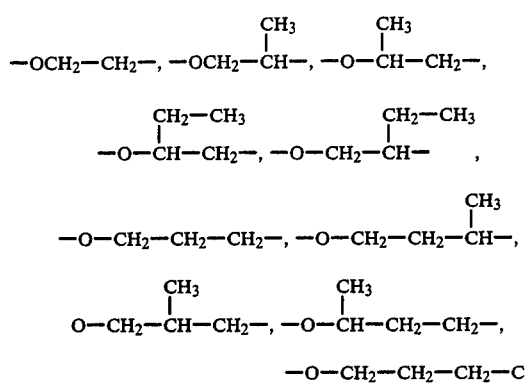

$R_4$ is selected from the group consisting of H, $-CH_3$, $-CH_2-CH_3$, $-CH_2-CH_2-CH_3$,

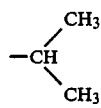

X is a dispersing group such as

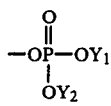

wherein $Y_1$ and $Y_2$ are selected from the group consisting of H, Na, Li, K;

(2) a polyoxyalkyl polyol represented by the following formula:

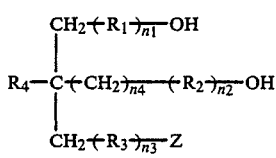

wherein Z is —OH; and (3) an organic isocyanate compound, wherein said phosphorylated polyoxyalkyl polyol, said polyoxyalkyl polyol, and said isocyanate compound are present in a ratio which effectively homogeneously disperses said magnetic powder and securely binds said magnetic powder when coated on said non-magnetic support.

6. The magnetic recording medium of claim 5 wherein said polyoxyalkyl polyol present in an amount in the range of 0.1 to 50 percent weight of the binder.

7. The magnetic recording medium of claim 6 wherein said isocyanate compound is present in an amount in the range of 30 to 60 percent by weight of the binder.

8. The magnetic recording medium of claim 5 wherein said isocyanate compound contains at least three reactive isocyanate groups.

9. The magnetic recording medium of claim 8 wherein said isocyanate compound is an aromatic isocyanate compound.

10. A magnetic recording medium comprising a non-magnetic support and a coating of a dispersion of a magnetic powder in a binder, said binder consisting essentially of a cured compound derived from:

(1) a phosphorylated polyoxyalkyl polyol present in an amount in the range of 5 to 60 percent by weight of the binder and represented by the following formula:

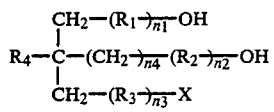

wherein
$n_1$, $n_2$ and $n_3$ may independently be 0 to 10 inclusive and $n_4$ is 0 or 1

$R_1$, $R_2$, $R_3$ are independently selected from the group consisting of

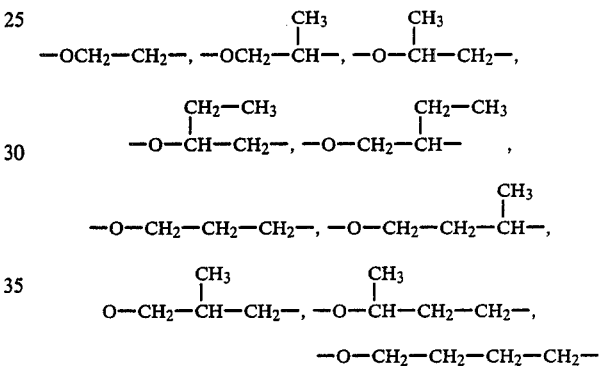

$R_4$ is selected from the group consisting of H, $-CH_3$, $-CH_2-CH_3$, $-CH_2-CH_2-CH_3$,

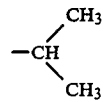

X is a dispersing group such as

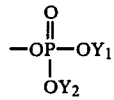

wherein $Y_1$ and $Y_2$ are selected from the group consisting of H, Na, Li, K;

(2) an organic isocyanate compound, and (3) a vinyl polymer wherein said phosphorylated polyoxyalkyl polyol, said isocyanate compound and said vinyl polymer are present in a ratio which effectively homogeneously disperses said magnetic powder and securely binds said magnetic powder when coated on said non-magnetic support.

11. The magnetic recording medium of claim 10 wherein said isocyanate compound is present in an amount in the range of 20 to 60 percent by weight of the binder.

12. The magnetic recording medium of claim 11 wherein said vinyl polymer is present in an amount in the range of 0.1 to 45 percent by weight of the binder.

13. The magnetic recording medium of claim 10 wherein said isocyanate compound contains at least three reactive isocyanate groups.

14. The magnetic recording medium of claim 13 wherein said isocyanate compound is an aromatic isocyanate compound.

15. The magnetic recording medium of claim 10 wherein said vinyl polymer is selected from the group consisting of poly(vinyl chloride), poly(vinyl chloride-vinyl acetate), poly(vinyl chloride-vinyl acetate-vinyl alcohol), and poly(vinylidene chloride).

16. A magnetic recording medium comprising a non-magnetic support and a coating of a dispersion of a magnetic powder in a binder, said binder consisting essentially of a cured compound derived from:
   (1) a phosphorylated polyoxyalkyl polyol present in an amount in the range of 5 to 60 percent by weight and represented by the following formula:

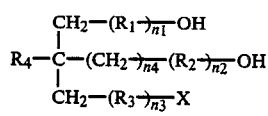

wherein
   $n_1$, $n_2$ and $n_3$ may independently be 0 to 10 inclusive and $n_4$ is 0 or 1
   $R_1$, $R_2$, $R_3$ are independently selected from the group consisting of

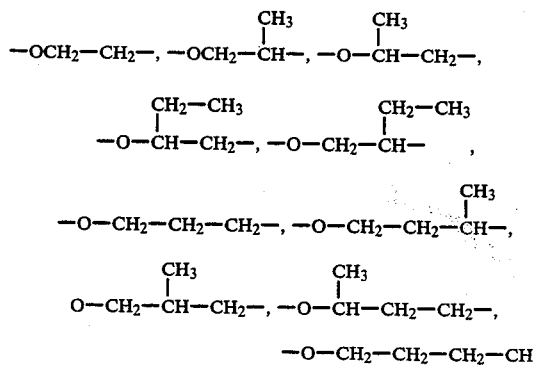

$R_4$ is selected from the group consisting of H, —CH$_3$, —CH$_2$—CH$_3$, —CH$_2$—CH$_2$—CH$_3$,

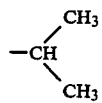

X is a dispersing group such as

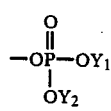

wherein $Y_1$ and $Y_2$ are selected from the group consisting of H, Na, Li, K;
   (2) a polyoxyalkyl polyol represented by the following formula:

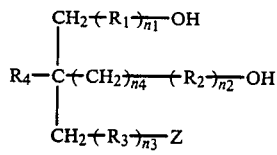

wherein Z is —OH;
   (3) an organic isocyanate compound; and
   (4) a vinyl polymer;
wherein said phosphorylated polyoxyalkyl polyol, said polyoxyalkyl polyol, said isocyanate compound and said vinyl polymer are present in a ratio which effectively homogeneously disperses said magnetic powder and securely binds said magnetic powder when coated on said non-magnetic support.

17. The magnetic recording medium of claim 16 wherein said polyoxyalkyl polyol is present in an amount in the range of 0.1 to 50 percent by weight.

18. The magnetic recording medium of claim 17 wherein said isocyanate compound is present in an amount in the range of 20 to 60 percent by weight.

19. The magnetic recording medium of claim 18 wherein said vinyl copolymer is present in an amount in the range of about 0.1 to 45 percent by weight.

20. The magnetic recording medium of claim 16 wherein said isocyanate compound contains at least three reactive isocyanate groups.

21. The magnetic recording medium of claim 20 wherein said isocyanate compound is an aromatic isocyanate.

22. The magnetic recording medium of claim 16 wherein said vinyl polymer is selected from the group consisting of poly(vinyl chloride), poly(vinyl chloride-vinyl acetate), poly(vinyl chloride-vinyl acetate-vinyl alcohol), and poly(vinylidene chloride).

23. A dispersion of a magnetic powder in a binder, said dispersion consisting essentially of:
   (1) a phosphorylated polyoxyalkyl polyol present in an amount in the range of 30 to 80 percent by weight of the binder and represented by the following formula:

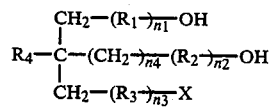

wherein
   $n_1$, $n_2$ and $n_3$ may independently be 0 to 10 inclusive and $n_4$ is 0 or 1
   $R_1$, $R_2$, $R_3$ are independently selected from the group consisting of

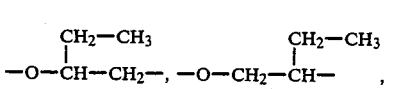

-continued

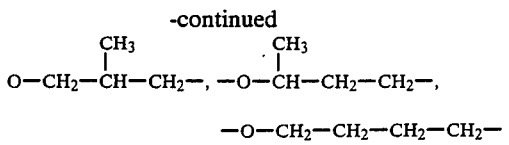

R$_4$ is selected from the group consisting of H, —CH$_3$, —CH$_2$—CH$_3$, —CH$_2$—CH$_2$—CH$_3$,

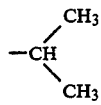

X is a dispersing group such as

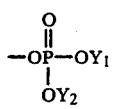

wherein Y$_1$ and Y$_2$ are selected from the group consisting of H, Na, Li, K; and (2) an organic isocyanate compound;
wherein said phosphorylated polyoxyalkyl polyol and said organic isocyanate compound are present in a ratio which effectively homogeneously disperses said magnetic powder and securely binds said magnetic powder when coated on said non-magnetic support.

24. A dispersion of a magnetic powder in a binder, said dispersion consisting essentially of:
(1) a phosphorylated polyoxyalkyl polyol present in an amount in the range of 10 to 60 percent by weight of the binder and represented by the following formula:

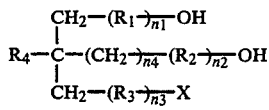

wherein
n$_1$, n$_2$ and n$_3$ may independently be 0 to 10 inclusive and n$_4$ is 0 or 1
R$_1$, R$_2$, R$_3$ are independently selected from the group consisting of

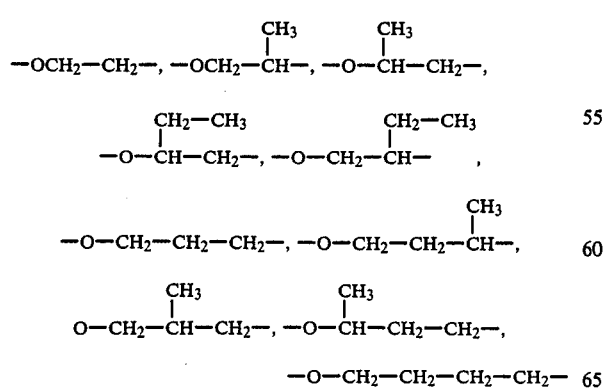

R$_4$ is selected from the group consisting of H, —CH$_3$, —CH$_2$—CH$_3$, —CH$_2$—CH$_2$—CH$_3$,

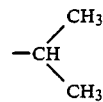

X is a dispersing group such as

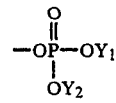

wherein Y$_1$ and Y$_2$ are selected from the group consisting of H, Na, Li, K;
(2) a polyoxyalkyl polyol represented by the following formula wherein:

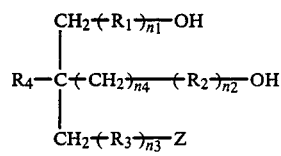

wherein Z is —OH; and
(3) an organic isocyanate compound,
wherein said phosphorylated polyoxyalkyl polyol, said polyoxyalkyl polyol, and said isocyanate compound are present in a ratio which effectively homogeneously disperses said magnetic powder and securely binds said magnetic powder when coated on said non-magnetic support.

25. A dispersion of a magnetic powder in a binder, said dispersion consisting essentially of:
(1) a phosphorylated polyoxyalkyl polyol present in the amount in the range of 5 to 60 percent by weight of the binder and represented by the following formula:

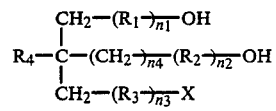

wherein
n$_1$, n$_2$ and n$_3$ may independently be 0 to 10 inclusive and n$_4$ is 0 or 1
R$_1$, R$_2$, R$_3$ are independently selected from the group consisting of

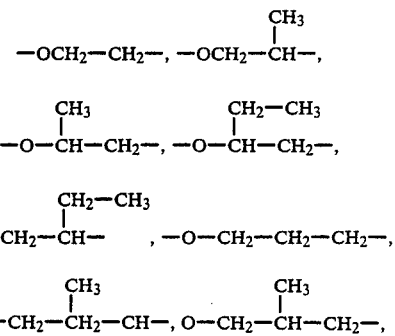

-continued

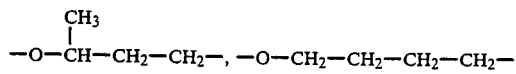

R$_4$ is selected from the group consisting of H, —CH$_3$, —CH$_2$—CH$_3$, —CH$_2$—CH$_2$—CH$_3$,

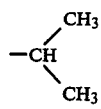

X is a dispersing group such as

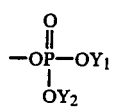

wherein Y$_1$ and Y$_2$ are selected from the group consisting of H, Na, Li, K;

(2) an organic isocyanate compound; and
(3) a vinyl polymer;

wherein said phosphorylated polyoxyalkyl polyol, said isocyanate compound and said vinyl polymer are present in a ratio which effectively homogeneously disperses said magnetic powder and securely binds said magnetic powder when coated on said non-magnetic support.

26. A dispersion of a magnetic powder in a binder, said dispersion consisting essentially of:

(1) a phosphorylated polyoxyalkyl polyol present in an amount in the range of 5 to 60 percent by weight and represented by the following formula:

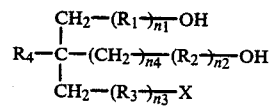

wherein n$_1$, n$_2$ and n$_3$ may independently be 0 to 10 inclusive and n$_4$ is 0 or 1

R$_1$, R$_2$, R$_3$ are independently selected from the group consisting of

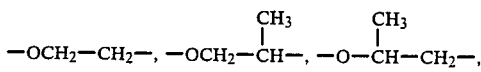

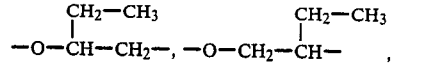

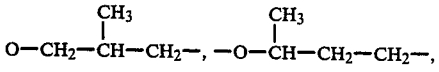

R$_4$ is selected from the group consisting of H, —CH$_3$, —CH$_2$—CH$_3$, —CH$_2$—CH$_2$—CH$_3$,

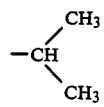

X is a dispersing group such as

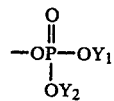

wherein Y$_1$ and Y$_2$ are selected from the group consisting of H, Na, Li, K;

(2) a polyoxyalkyl polyol represented by the following formula:

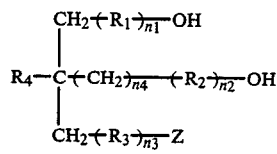

wherein Z is —OH;
(3) an organic isocyanate compound; and
(4) a vinyl polymer;

wherein said phosphorylated polyoxyalkyl polyol, said polyoxyalkyl polyol, said isocyanate compound and said vinyl polymer are present in a ratio which effectively homogeneously disperses said magnetic powder and securely binds said magnetic powder when coated on said non-magnetic support.

* * * * *